Oct. 26, 1943.    C. SAURER ET AL    2,332,976
TRACK SHOE FOR ENDLESS TRACKS
Filed July 16, 1941    2 Sheets-Sheet 1

INVENTORS
CURT SAURER
CLARENCE W. TYLER
BY Kwis Hudson & Kent
ATTORNEYS

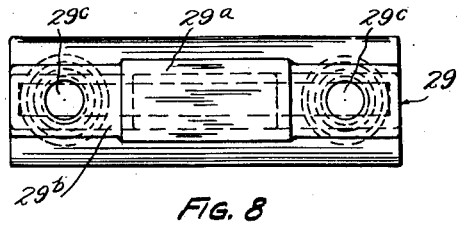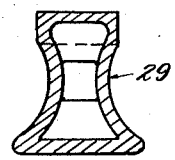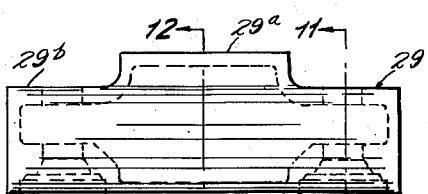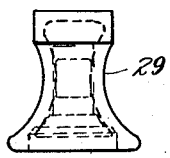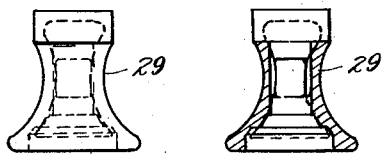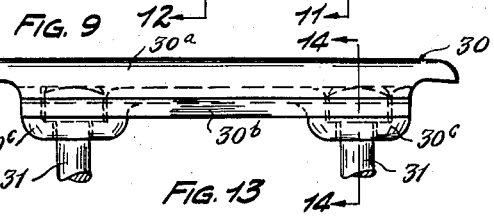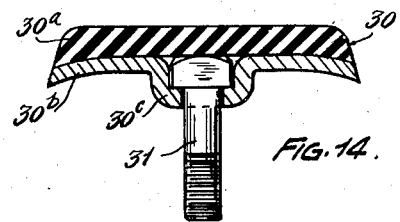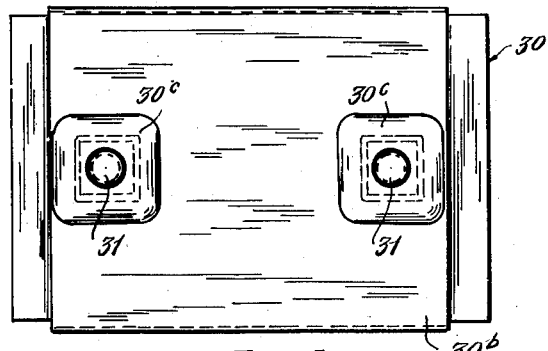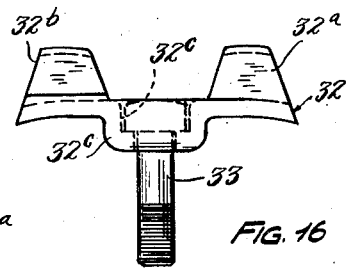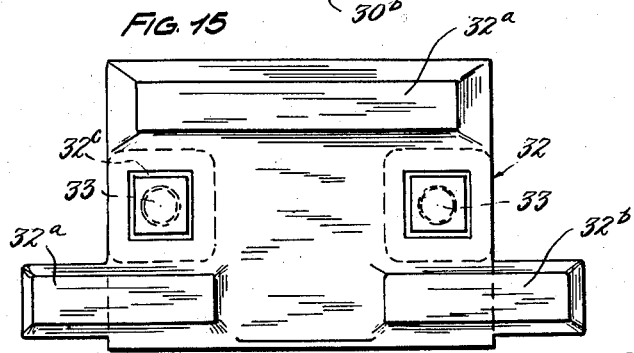

Patented Oct. 26, 1943

2,332,976

UNITED STATES PATENT OFFICE 2,332,976

TRACK SHOE FOR ENDLESS TRACKS

Curt Saurer, Akron, and Clarence W. Tyler, Wickliffe, Ohio, assignors to The Ohio Rubber Company, Willoughby, Ohio, a corporation of Ohio Application July 16, 1941, Serial No. 402,670

6 Claims. (Cl. 305—10)

This invention relates to track shoes for the endless tracks of vehicles, such as tanks and tractors.

The main object of the present invention is to provide certain improvements by which the life of the shoes will be greatly extended and by which there is obtained a greater cushioning effect between the shoes and the surface over which the track-laying vehicle is being operated, resulting in easier riding qualities and reduced vibration and longer life to the vehicle or at least many of its parts.

This and other objects are attained very effectively by providing a track shoe having a removable or replaceable tread which is secured to a floating insert which is embedded in a body of semi-soft rubber or equivalent yieldable material forming a part of the track shoe body. This tread may be of different forms depending upon the character of the surface over which the vehicle is operated, i. e., it may be formed solely of steel (or other metal or alloy) or of steel and rubber.

The invention may be further briefly summarized as consisting in certain novel details of construction and combinations and arrangements of parts which will be described in the specification and set forth in the appended claims.

In the accompanying sheets of drawings wherein we have shown an embodiment of the invention which operates very effectively, Fig. 1 is a side view of a section of the endless track showing several of the track shoes which embody the present invention;

Fig. 2 is a plan view on an enlarged scale of one of the track shoes, parts being broken away and other parts being in section, the shoe here shown being provided with one of several forms of removable treads, this figure as well as Figs. 3, 4, and 5 omitting the link pins which in the completed shoe extend through the tubes of the track shoe frame and omitting also the rubber or other yieldable sleeves between the pins and the tubes;

Figs. 8, 9, 10, 11, and 12 are views of the floating insert of the track shoe, Fig. 8 being a plan view, Fig. 9 being a side view, Fig. 10 being an end view, and Figs. 11 and 12 being transverse sectional views along the lines 11—11 and 12—12 respectively of Fig. 9;

Figs. 13, 14, and 15 are views of one form of removable tread for the shoe, Fig. 13 being a side view, Fig. 14 being a transverse sectional view along the line 14—14 of Fig. 13, and Fig. 15 being a bottom view; and Figs. 16 and 17 are views of another form of removable tread for the shoe, Fig. 16 being an end view and Fig. 17 being a top plan view.

Figure 2:
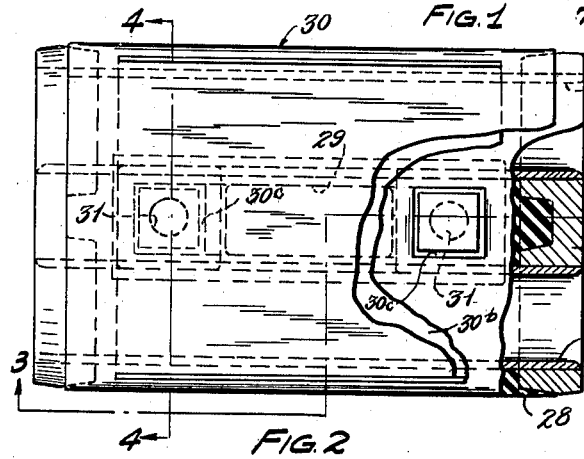
Figure 4:
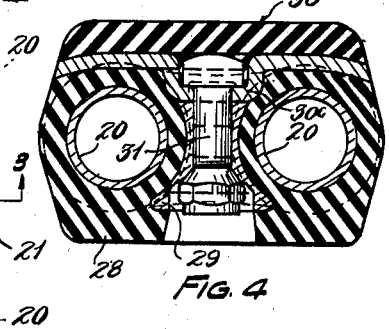
Fig. 4 is a transverse sectional view substantially along the line 4—4 of Fig. 2.
Figure 7:
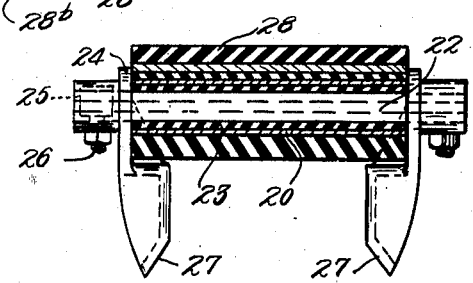
Fig. 7 is a transverse sectional view through the endless track substantially along the line 7—7 of Fig. 1.
Figure 6:
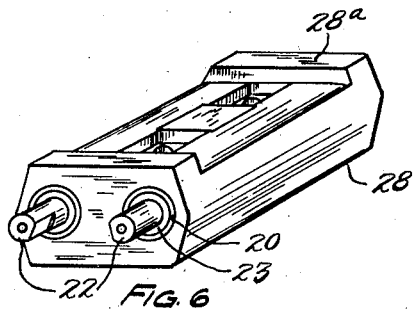
Fig. 6 is a perspective view of the shoe omitting the removable tread.

Referring now to the drawings, the framework of our improved track shoe may be of usual construction. Accordingly, it includes two parallel tubes 20 which extend crosswise of the shoe adjacent opposite ends thereof, the ends of the tubes at opposite sides of the shoe being secured together by metal side bars 21 preferably in the form of steel forgings with flanged ends which are fitted onto the ends of the tubes and may be secured thereto as by brazing, see Fig. 2. Additionally, the framework of the shoe includes pins 22 generally termed "link pins" which extend centrally through and beyond the ends of the tubes, there being an annular body of rubber or equivalent yieldable material 23 completely filling the annular space between the inner wall of each tube and the outer wall of the corresponding pin, see Figs. 6 and 7. This annular sleeve-like body of rubber 23 may be vulcanized to the pin 22 and frictionally engages the inner wall of each tube 20 with a tight fit.

Figure 1:
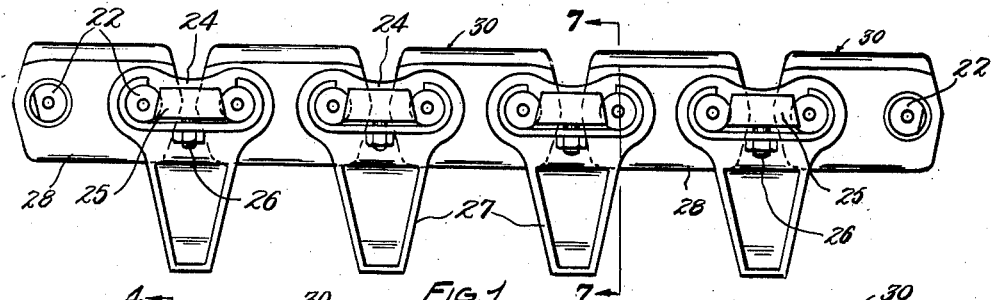

Adjacent shoes are connected together to form the complete endless track by links 24 which may be secured by keying or otherwise to the projecting ends of the pins 22 of the adjacent ends of each pair of adjacent shoes. Generally, the links are fitted onto the ends of the pins and each is held in place by a key 25 slipped into notches formed on the ends of the pins and secured in position by one or more screws 26, see Fig. 1.

The links 24 are adapted to engage the driving sprocket of the tank, tractor, or other vehicle, and generally they are provided with inwardly projecting teeth 27 which engage the ends of the sprocket wheel and also the ends of a track supporting wheel spaced a suitable distance from the sprocket and over both of which the track travels, as well as the ends of the supporting bogey wheels. The parts so far described are of usual construction.

Coming now to the parts or features more directly involving our invention, it will be observed that the entire track shoe frame, with the exception of the outer portions of the side bars 21 and of the link pins 22, is embedded in a body of semi-soft rubber 28 or equivalent yieldable material which is molded and vulcanized around the track shoe frame so as to strongly adhere to the parts thereof which it encloses. The term "rubber" is used herein in a broad sense as including not only natural rubber but also any of the artificial rubbers or other suitable yieldable material having the necessary properties of long life and the desired cushioning effect.

It is an important feature of the invention that when the rubber is molded to and around the parts of the track shoe frame there is embedded in the rubber a part which may be aptly termed a floating metal insert 29. This insert is preferably a casting of malleable iron or other suitable metal or alloy, and it extends crosswise of the shoe between the tubes. It is preferably cast hollow for the sake of lightness, as best shown in Figs. 3, 5, 11, and 12. Its ends terminate just short of the end plates 21 and it is spaced from the latter as well as from the tubes 20 and, in fact, from all other metal portions of the track shoe frame from all of which it is cushioned— hence the term floating insert.

Although so far as our present invention is concerned the floating insert 29 may assume various shapes, we prefer that it have the shape shown in Figs. 8 to 12 inclusive. The top of the insert is preferably exposed at the top of the body 28 of rubber, and it is preferably provided with an elevated middle portion 29a and with relatively depressed end portions 29b, as best shown in Figs. 8 and 9. The side walls of the insert may be curved concentrically with respect to the tubes 20, note particularly Figs. 4 and 5, and the bottom may be flared out somewhat beneath the tubes so that it is somewhat wider at the bottom than at the top, as shown in Figs. 4, 5, 10, 11, and 12. However, these details may be other than herein illustrated. The relatively depressed end portions 29b are provided in their top and bottom walls with aligned bolt openings 29c.

Figure 3:
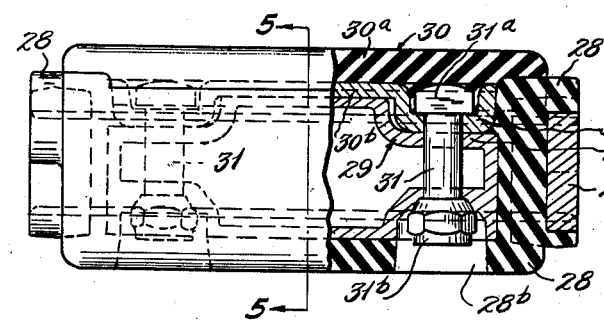
Fig. 3 is a side view of the shoe shown in Fig. 2 with parts in section, taken substantially along the line 3—3 of Fig. 2.
Figure 5:
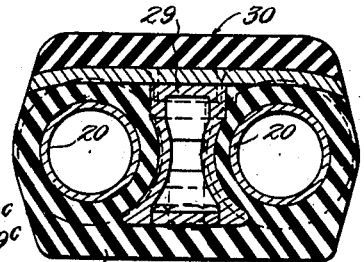
Fig. 5 is a similar sectional view substantially along the line 5—5 of Fig. 3.

The function of this floating insert is to form a yieldable anchorage for a removable or replaceable tread or ground engaging member for the track shoe. The tread may have different shapes and may be formed of different materials. For example, it may be a composite tread of steel and rubber or it may be formed of steel alone. The term "steel" of course is used in a broad sense to include any equivalent strong, tough metal or alloy. In Figs. 2 to 5 and in Figs. 13 to 15 we have shown a tread 30 composed of an outer layer 30a of rubber vulcanized to a steel or other metal base 30b. This tread, which extends substantially the full length of the shoe (crosswise of the track) and substantially the full width of the shoe is adapted to engage and to be secured to the floating insert 29 by two bolts 31 the heads 31a of which are embedded in the rubber 30a and are seated in depressed portions or pockets 30c formed on the lower side of the metal portion 30b of the tread near the ends of the latter, as most clearly shown in Figs. 2, 3, 4, 13, 14, and 15. The pockets or depressed portions 30c fit onto the relatively depressed portions 29b of the insert 29 and the middle part of the metal portion 30b of the tread engages the relatively elevated middle portion 29a of the insert. The ends of the rubber portion of the tread may extend beyond the ends of the metal portion 30b and are adapted to rest on the elevated shoulders 28a of the rubber body 28, as best shown in Fig. 3. The inner ends of the bolts are provided with nuts 31b which are accessible through openings 28b formed on the inner side of the body of rubber 28, as most clearly illustrated in Fig. 3.

In this manner the removable tread may be secured to the shoe without any metal-to-metal contact except with the floating insert 29 and without any compression of the rubber in either the shoe or in the rubber body 28 so that the maximum degree of resilience is obtained when the shoes of the endless track are traveling over the ground or other surface.

The removable tread referred to above is very well adapted for use when the vehicle equipped with endless tracks having shoes formed in accordance with our invention is traveling over a cement, brick, or other hard surface, and it might be mentioned at this point the outer side of the rubber portion 30a of the tread may of course be provided with any desired non-skid tread surface.

When the vehicle is adapted for traveling over relatively soft or slippery ground, the tread is preferably formed of steel or other metal, as illustrated at 32 in Figs. 16 and 17, in which case it may have on its tread face any suitable arrangement of lugs or grouters 32a and 32b. In this instance there is one grouter 32a near one edge of the shoe and a pair of grouters staggered with respect to the grouter 32a arranged adjacent the other edge of the shoe. The grouters 32b project beyond the body of the tread 32 and are adapted to engage over the elevated portions 28a of the rubber body 28. This tread, like the tread 30, is adapted to be secured to the insert by nuts threaded onto the inner ends of the bolts 33. In this instance the heads of the bolts are seated in depressed portions or pockets 32c of the tread, and these pockets, which correspond to the pockets 30c of the first described tread, are adapted to engage the relatively depressed portions 29b of the insert while the middle portion of the tread will engage the relatively elevated middle portion 29a of the insert.

We are aware of the fact that it has been proposed heretofore to provide the shoes of endless tracks with removable or replaceable treads, but, so far as we know, in such proposed prior constructions the full advantages of the use of replaceable treads have not been attained, and, to our knowledge, such proposed removable or replaceable tread has never been secured to a floating insert embedded in a body of rubber, and by reason of this novel construction and combination, the advantages or objects set forth in the early part of the specification are attained to a very high degree.

While we have shown the preferred construction with two different forms of removable or replaceable treads, we do not desire to be confined to the precise details or arrangements illustrated, but aim in our claims to cover all modifications which do not improve a departure from the spirit and the scope of our invention.

Having thus described our invention, we claim:

1. A shoe for the tracks of track-laying vehicles comprising a shoe frame having a body of rubber provided with a floating insert, and a removable tread for said shoe secured to said floating insert in face to face relation thereto.

2. A shoe for the tracks of track-laying vehicles comprising a shoe frame with portions thereof enclosed in a body of rubber vulcanized thereto, and a floating insert embedded in said body of rubber and to which a removable tread is adapted to be secured in face to face relation thereto.

3. A shoe for the tracks of track-laying vehicles comprising a shoe frame carrying a body of rubber vulcanized thereto with a floating insert embedded in the rubber and exposed at the outer face of the rubber body, said floating insert forming an anchorage to which a removable or replaceable tread may be secured.

4. A shoe for the tracks of track-laying vehicles, said shoe having a frame carrying a body of rubber vulcanized thereto with a floating insert embedded in the rubber, and a removable tread secured to said insert, the insert having a relatively elevated middle portion and relatively depressed end portions, and the tread having a relatively elevated middle portion and relatively depressed end portions engaging the corresponding portions of the insert, and securing bolts passing through the relatively depressed portions of the insert and tread.

5. A shoe for the tracks of track-laying vehicles, said shoe having a frame carrying a body of rubber vulcanized thereto with a floating insert embedded in the rubber, and a removable tread secured to said insert, the insert having relatively elevated and depressed portions and the tread having relatively elevated and depressed portions engaging the corresponding portions of the insert.

6. A shoe for the tracks of track-laying vehicles, said shoe having a frame carrying a body of rubber vulcanized thereto with a floating insert embedded in the rubber, and a removable tread secured to said insert, the insert having relatively elevated and depressed portions and the tread having relatively elevated and depressed portions engaging the corresponding portions of the insert, and securing bolts passing through the relatively depressed portions of the insert and tread.

CURT SAURER.
CLARENCE W. TYLER.